(12) United States Patent
Hemphill et al.

(10) Patent No.: US 7,918,565 B2
(45) Date of Patent: Apr. 5, 2011

(54) EXPANDING CHASSIS FOR IMAGING SYSTEMS

(75) Inventors: Bryan Hemphill, Waterloo (CA); Les Hirst, Waterloo (CA); Dan Adema, Kitchener (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 327 days.

(21) Appl. No.: 12/183,653

(22) Filed: Jul. 31, 2008

(65) Prior Publication Data

US 2010/0026973 A1    Feb. 4, 2010

(51) Int. Cl.
G03B 21/22 (2006.01)

(52) U.S. Cl. .......................................... 353/78; 353/94

(58) Field of Classification Search .............. 353/74, 353/78, 94, 119; 359/443, 449; 348/840
See application file for complete search history.

(56) References Cited

U.S. PATENT DOCUMENTS

| | | | |
|---|---|---|---|
| 4,974,073 A | 11/1990 | Inova | |
| 5,136,390 A | 8/1992 | Inova | |
| 5,767,818 A | 6/1998 | Nishida | |
| 6,081,375 A * | 6/2000 | Furuya et al. | 359/460 |
| 6,115,022 A | 9/2000 | Mayer, III et al. | |
| 6,219,011 B1 | 4/2001 | Aloni et al. | |
| 6,335,829 B1 | 1/2002 | Van De Voorde | |
| 6,501,441 B1 | 12/2002 | Ludtke et al. | |
| 6,550,521 B1 | 4/2003 | McNabb | |
| 6,760,075 B2 | 7/2004 | Mayer, III et al. | |
| 6,771,307 B2 | 8/2004 | Waki et al. | |
| 6,791,513 B2 | 9/2004 | Ogino et al. | |
| 6,799,836 B2 * | 10/2004 | Silverbrook | 347/54 |
| 6,956,541 B2 | 10/2005 | McClintock | |
| 7,248,229 B2 | 7/2007 | Zerphy et al. | |
| 2001/0026326 A1 | 10/2001 | Itaki et al. | |
| 2005/0018040 A1 | 1/2005 | Buchner et al. | |
| 2005/0219467 A1 | 10/2005 | Nomizo et al. | |

FOREIGN PATENT DOCUMENTS

| | | |
|---|---|---|
| DE | 4006189 | 9/1991 |
| JP | 08 088820 A | 4/1996 |
| JP | 2000 276099 A | 10/2000 |
| JP | 2002-162689 | 6/2002 |
| WO | 99/13377 | 3/1999 |
| WO | 99/29117 A | 6/1999 |
| WO | WO 00/18138 | 3/2000 |
| WO | WO 00/18139 | 3/2000 |

(Continued)

OTHER PUBLICATIONS

European Search Report mailed Oct. 26, 2009 in corresponding European Patent Application 09009079.6.

(Continued)

*Primary Examiner* — Thanh X Luu

(74) *Attorney, Agent, or Firm* — Staas & Halsey LLP

(57) ABSTRACT

An expanding chassis for an imaging unit is provided, the expanding chassis for use in imaging systems having a plurality of imaging units arranged in an array. The expanding chassis comprises a rigid frame for housing a light engine and related circuitry, and for mounting a screen on a front surface of the rigid frame for use with the light engine. The expanding chassis further comprises at least one expandable interface pad on at least one side of the rigid frame. The rigid frame and the expandable interface pad have a combined thermal expansion characteristic that provides an overall expansion in the expanding chassis that substantially matches the expansion of the screen.

4 Claims, 10 Drawing Sheets

FOREIGN PATENT DOCUMENTS

WO    2006/115852    11/2006

OTHER PUBLICATIONS

Ezekiel S. Bhasker et al: "Asynchronous Distributed Calibration for Scalable and Reconfigurable Multi-Projector Displays," IEEE Transactions on Visualization and Computer Graphics, IEE Service Center, Los Alamitos, CA, US, vol. 12, No. 5, Sep. 1, 2006, pp. 1101-1108, XP011150906, ISSN 1077-2626.

U.S. Appl. No. 12/119,191, filed May 12, 2008, Michael Perkins et al., Christie Digital Systems, USA, Inc. Cypress, CA.

European Search Report issued on Oct. 20, 2008 in corresponding European Application 08 25 1680.

U.S. Office Action mailed May 26, 2010 in related U.S. Appl. No. 11/748,255.

Partial European Search Report from corresponding European Application No. 08 25 1680.

U.S. Restriction Requirement mailed Mar. 23, 2010 in corresponding U.S. Appl. No. 11/748,255.

U.S. Office Action mailed May 26, 2010 in corresponding U.S. Appl. No. 11/748,255.

Notice of Allowance mailed Oct. 19, 2010 in corresponding U.S. Appl. No. 11/748,255.

Notice of Allowance mailed Nov. 1, 2010 in corresponding U.S. Appl. No. 12/119,191.

U.S. Appl. No. 11/748,255, filed May 14, 2007, Perkins et al., Christie Digital Systems USA, Inc.

\* cited by examiner

EXPANDING CHASSIS FOR IMAGING SYSTEMS

FIELD

The present invention relates to a chassis for mounting a configurable imaging system, and more particularly to a thermally expansive chassis for mounting a plurality of imaging units for generating respective portions of a composite image.

BACKGROUND

A large number of applications and potential applications exist for imaging systems such as projection displays that are used to display information. Such applications include, but are not limited to, general indoor signage (e.g. shopping malls, arcades, etc.), transportation signage (e.g. arrival/departure times, etc.), in-lobby signage for office buildings, control rooms, restaurants signage, etc.

It is known to provide large displays for signage and the like by assembling a multiplicity of small displays in an array (see, for example, WO 2006/115852 (Ostendo)). Unfortunately, in such an arrangement, adjacent displays are arranged with significant gaps so as to account for thermal expansion of each unit. Large gaps between adjacent screens have the potential to interfere with the optical transition from one display to the next, reducing overall image quality.

SUMMARY

According to an aspect of an embodiment, provided is a thermally expansive interface pad that is coupled to a rigid chassis so that the combined pad and chassis thermal expansion will substantially match the screen thermal expansion.

According to a further aspect of an embodiment, provided is an expanding chassis for an imaging unit for use in imaging systems having a plurality of imaging units arranged in an array, the expanding chassis comprising:

a rigid frame for housing a light engine and related circuitry, and for mounting a screen on a front surface of said rigid frame for use with said light engine; and at least one expandable interface pad on at least one side of said rigid frame;

said rigid frame and said expandable interface pad having a combined thermal expansion characteristic that provides an overall expansion in the expanding chassis that substantially matches the expansion of said screen.

According to a another aspect of an embodiment, in a microtile unit comprising a chassis and a screen, an improvement comprising an expanding chassis for matching the expansion noted in the screen, the expanding chassis comprising a rigid frame for housing a light engine and related circuitry, and for mounting a screen on a front surface of said rigid frame for use with said light engine; and at least one expandable interface pad on at least one side of said rigid frame;

said rigid frame having a first thermal expansion characteristic, said interface pad having a second thermal expansion characteristic, the combined thermal expansion characteristics providing an overall expansion in the expanding chassis that substantially matches the expansion of said screen.

BRIEF DESCRIPTION OF THE DRAWINGS

Embodiments will now be described, by way of example only, with reference to the attached Figures, wherein.

The skilled person in the art will understand that the drawings are for illustrative purposes only. The drawings are not intended to limit the scope of the applicant's teachings in any way.

DESCRIPTION OF EXEMPLARY EMBODIMENTS

Figure 1:
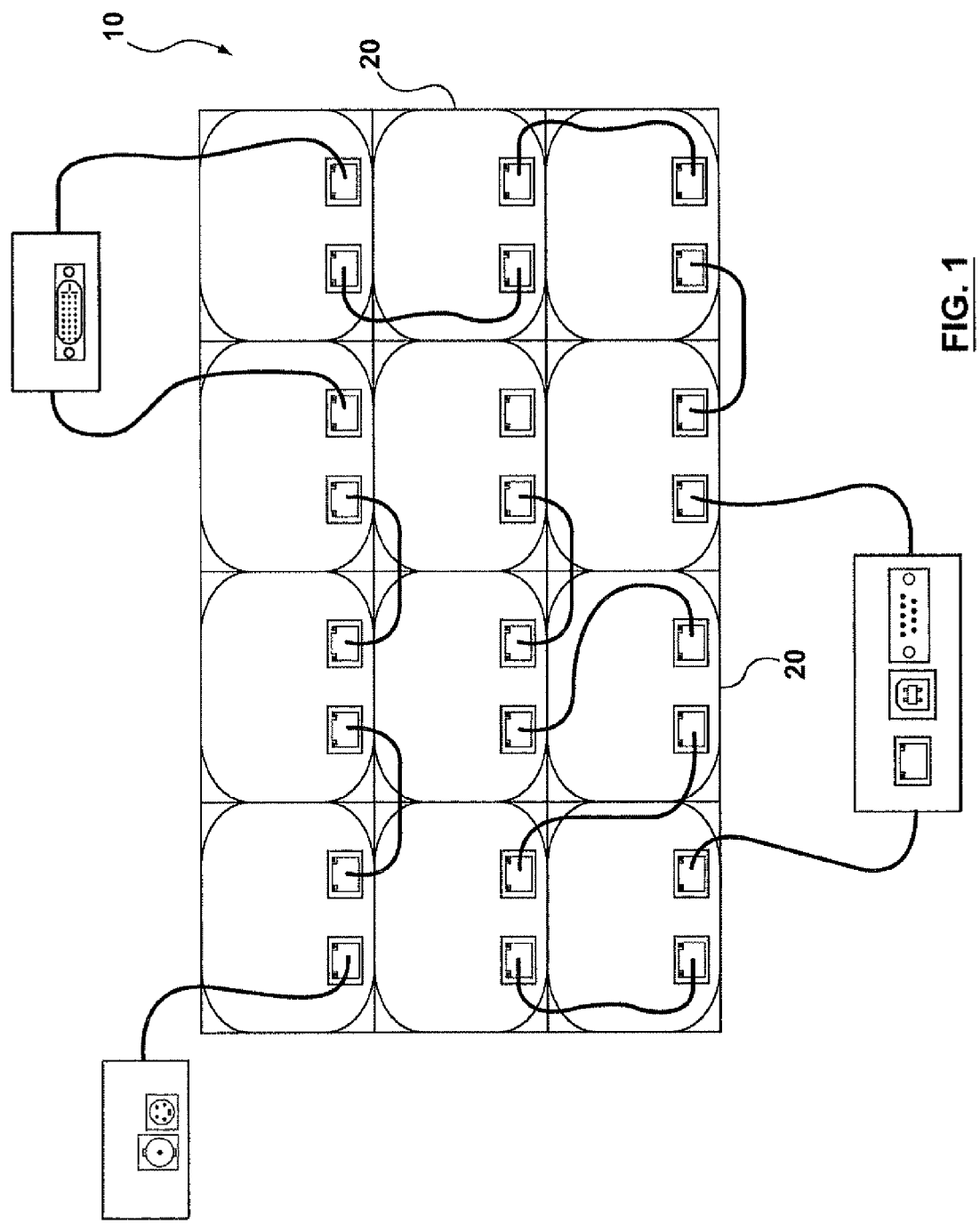
FIG. 1 is a block diagram of an exemplary imaging system comprising a plurality of imaging units.

In FIG. 1 an exemplary imaging system 10 is shown comprising a plurality of imaging (e.g. microtile) units assembled to form an array. Exemplary microtile units are described in Applicant's co-pending application entitled CONFIGURABLE IMAGING SYSTEM (U.S. patent application Ser. No. 12/119,191), which is herein incorporated by reference. Each microtile unit 20 generally contains a light engine and associated circuitry (including, for example, a microprocessor, RAM frame buffer, and video processing to provide image capture, resizing, color matching, edge blending, etc).

Figure 2:
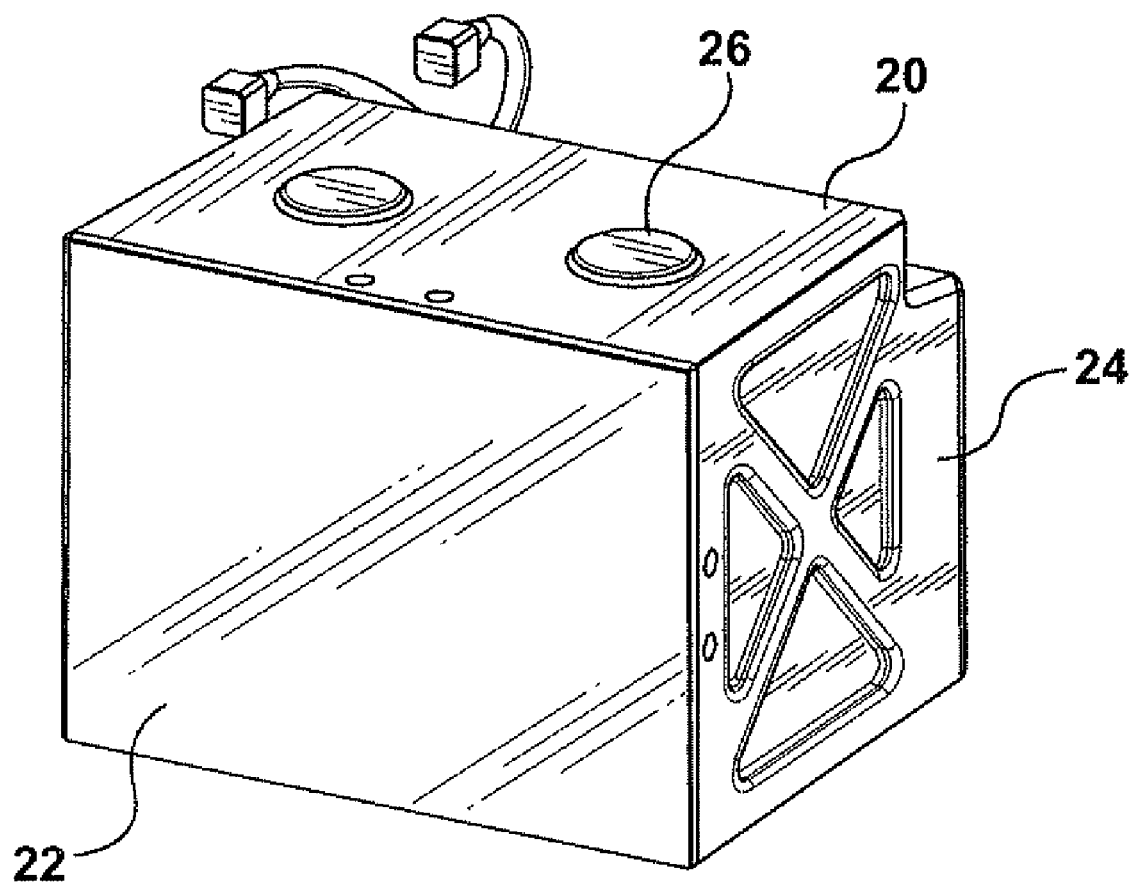
FIG. 2 is a front perspective view of an exemplary block microtile unit.

In FIG. 2, an exemplary microtile unit 20 is shown wherein the microtile unit is in the form of a "block". The front surface of each microtile unit 20 comprises a self-contained screen 22 mounted on a chassis 24. Positioned within the chassis of each microtile unit is a small rear projector (including light source, light valve, optics and associated electronics) for projecting an image on the screen 22. According to an exemplary embodiment, the light source is implemented using LEDs, although it is contemplated that lasers or other light sources may be utilized, the selection and implementation of which would be known to a person of ordinary skill in the art.

Figure 3B:
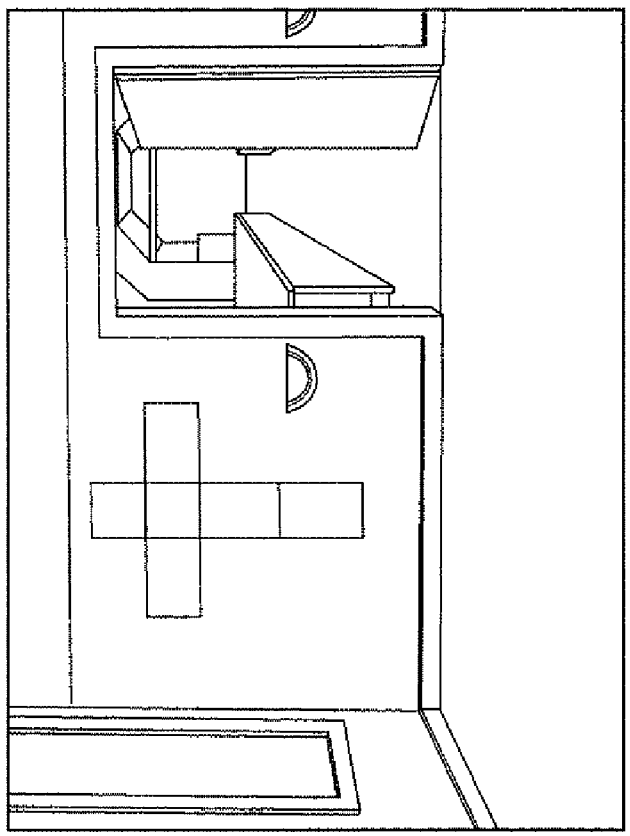
FIG. 3b is an exemplary cross-shaped arrangement of a plurality of microtile units.
Figure 3A:
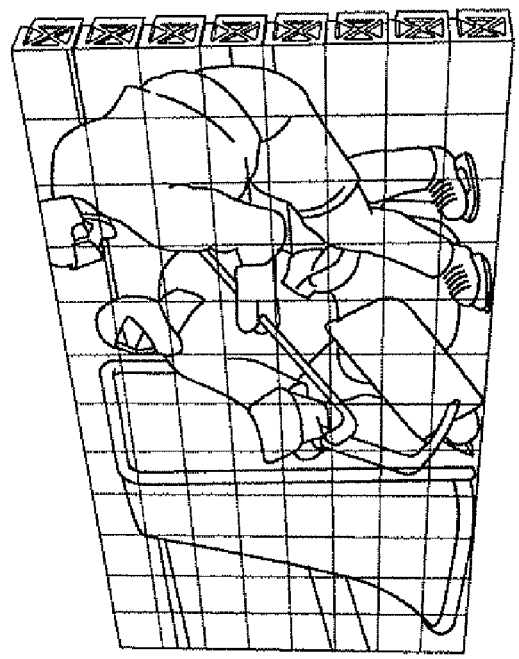
FIG. 3a is an exemplary rectangular arrangement of a plurality of microtile units.

Each unit projects a portion of a composite image (preferably at SVGA resolution to enable small pixel pitch (under 1 mm)), as shown in FIG. 3a. It will be noted that microtile units 20 are not required to be arranged in rectangular configurations, thereby resulting in significant flexibility in terms of display design. Note the arrangement shown in FIG. 3b in which the display takes the form of a cross comprising 6 microtile units 20.

Figure 4:
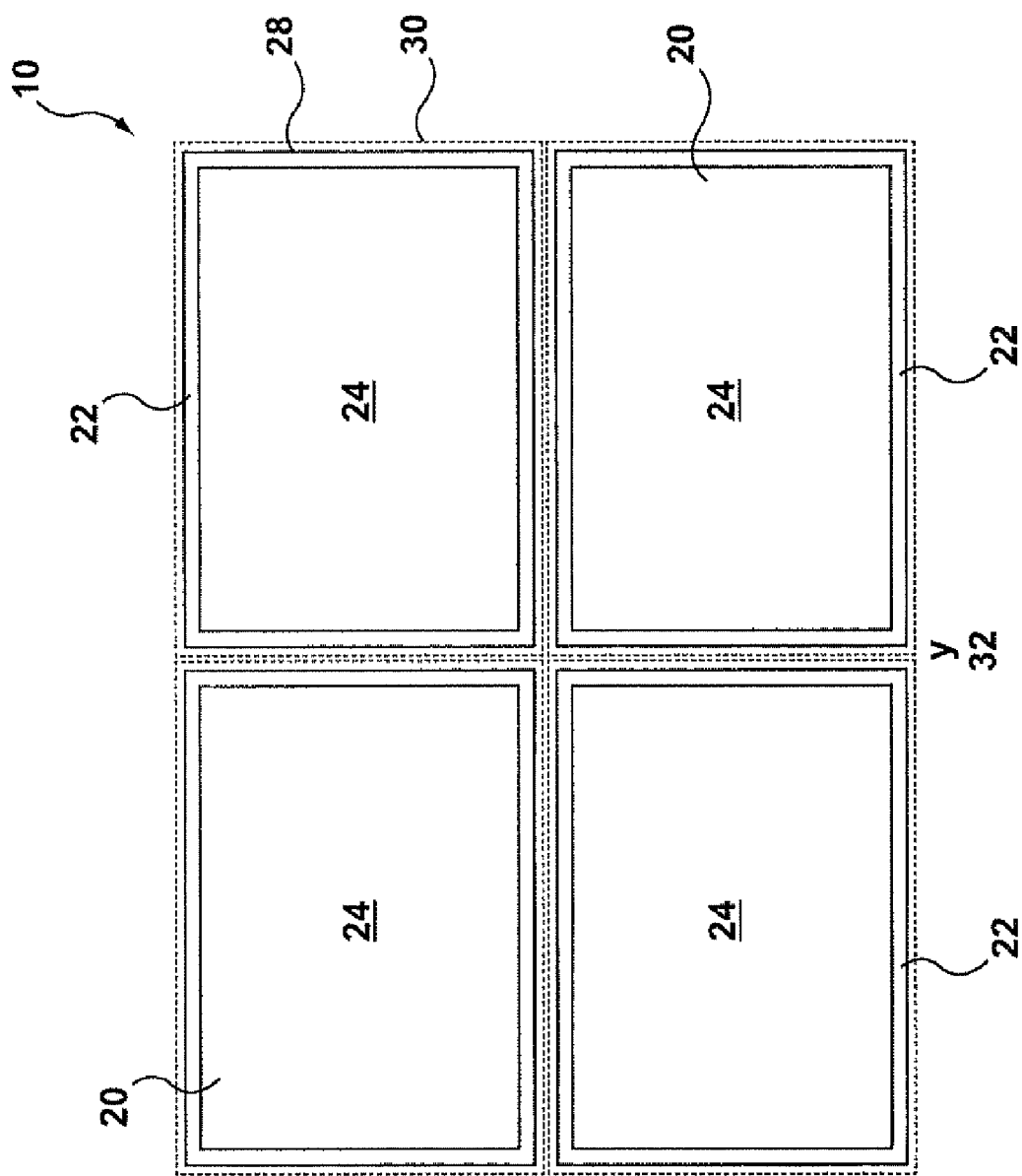
FIG. 4 is a schematic representation of screen expansion in an imaging system.

Regardless of the arrangement, coupling mechanisms permit physical registration or alignment of the microtile unit with other microtile units based on the shapes of protrusions on respective side surfaces of each microtile unit chassis. Exemplary protrusions 26 on the top of the microtile chassis 24 are shown in FIG. 2. It has been determined, however, that in constructions where the screen materials (generally comprising the screen, lenticular, diffusion layers, Fresnel, etc.) exhibit thermal expansion characteristics that differ (e.g. exceed) from that of the chassis, an expansion differential can result. Changes in temperature can arise from a number of sources, including, but not limited to operation of the imaging unit, and changes in the ambient temperature in which the imaging unit is located. FIG. 4 is a schematic representation of exemplary screen expansion in an imaging system 10 from a first state 28 at room temperature, to a second state 30 at elevated temperature. As a result, the overall composite screen area expands to a greater extent than the underlying plurality of chassis units, herein referred to as the chassis platform. To account for this expansion, a nominal gap 32 between adjacent screens 22 is required to avoid potentially damaging screen compression or collision. While the gap 32 is generally sized large enough to permit for thermal changes in screen size, it will be appreciated that a large gap between adjacent screens will interfere with the optical transition from one microtile to the next, reducing overall image quality.

To minimize the gap size, it is desirable to have the chassis 24 exhibit similar thermal expansion characteristics to that of the screen 22, thereby reducing the expansion differential. In this way, once an imaging system is arranged, the overall expansion noted in the screens is substantially matched by that of the underlying chassis platform. To achieve this, one option is to provide a chassis of plastic or similar construction having a comparable coefficient of thermal expansion (CTE) to the screen assembly. As the screen expands, so too does the chassis, thereby maintaining the expansion differential to a minimum. Unfortunately, a plastic chassis has potentially poor performance with respect to dimensional stability, particularly as it relates to component positioning. A plastic chassis may twist and distort as it expands and contracts, resulting in misalignment of the optical components.

Figure 5A:
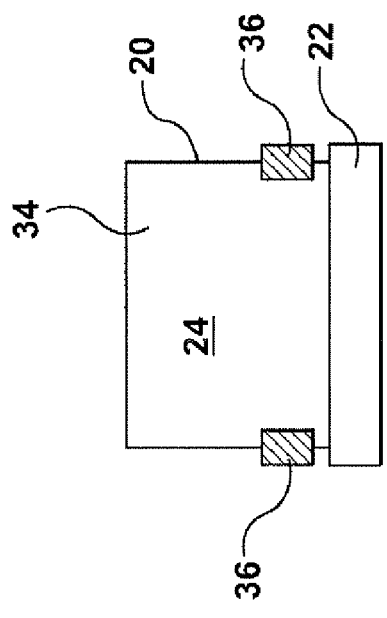
FIG. 5a is a schematic top-view representation of a microtile unit with an interface pad situated on each side.
Figure 5B:
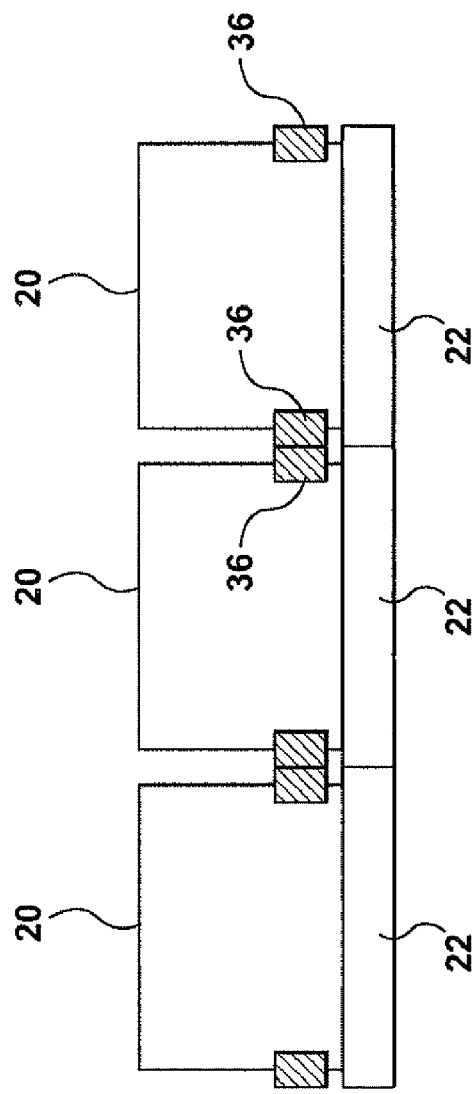
FIG. 5b is a schematic top-view representation of a plurality of microtile units with interface pads.

For greater dimensional stability, the chassis 24 of each microtile unit 20 is configured to generally comprise a rigid frame 34, and at least one expandable interface pad 36, as shown schematically in FIGS. 5a and 5b. The rigid frame 34 is made from a material with a CTE lower than the screen CTE, and which has the dimensional stability to maintain mating components in proper alignment. The rigid frame, 34 may also be configured to permit mounting of the microtile unit 20 to a supporting structure, such as a wall. Non-limiting examples of suitable materials for the chassis include aluminum, magnesium, and glass-filled nylon.

The interface pad 36 is generally a unitary block of material demonstrating a higher CTE than the screen CTE. While the interface pad may be a separate feature on the microtile unit to allow for chassis expansion, the interface pad may also be configured similar to and as a replacement of the aforementioned coupling mechanism to permit registration or alignment of the microtile unit with other microtile units. Whatever the arrangement, the chassis 24 and pad 36 dimensions will be set appropriately so that the combined thermal expansions of the rigid frame 34 and the pad 36 will substantially match the thermal expansion of the screen 22. As such, in an imaging system comprising a plurality of microtile units, the overall expansion noted in the screens is substantially matched by that of the chassis platform.

Figure 6:
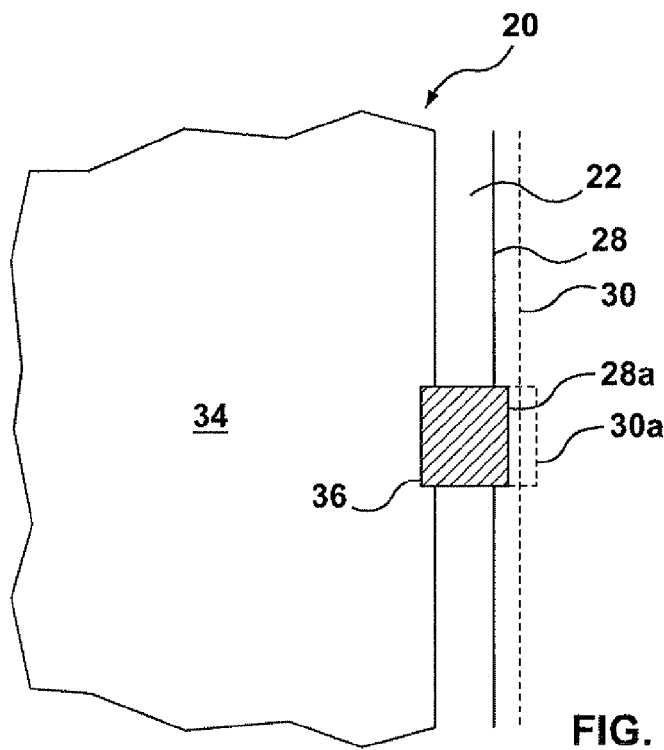
FIG. 6 is a schematic representation of screen and interface pad expansion, showing expansion from a first state, to a second state.

As the operating temperature increase, both the screen 22 and interface pads 36 expand. In the example shown in FIG. 6, the screen expands from a first state 28 to a second state 30, while the pad similarly expands from a first state 28a to a second state 30a. As such, the pads 36 effectively urge adjacently positioned microtile units away from one another, thereby maintaining the gap to reduce the likelihood of damaging screen compression or collision. A non-limiting example of a suitable material for the interface pad 36 includes Quadrant's Tivar 1000 UHMW PE having a GTE of 3.6 mm/m-10C. Other exemplary materials include, but are not limited to DuPont Teflon, DuPont Hytrel, Kolon SPELLOY PC+ABS, and Kolon NOPLA PEN-PET.

Figure 7:
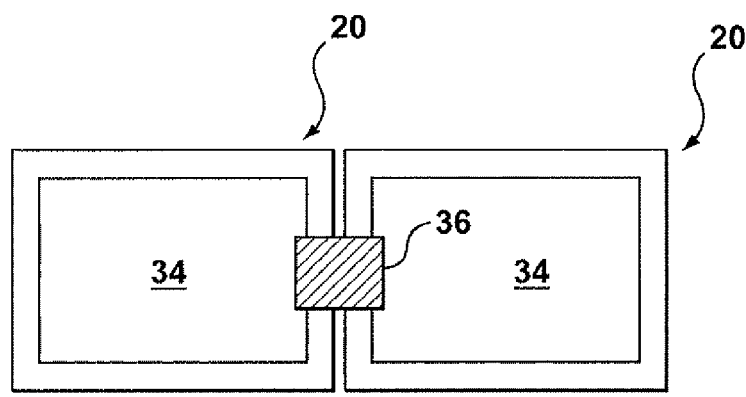
FIG. 7 shows two microtile units with a single unitary interface pad placed therebetween.
Figure 8:
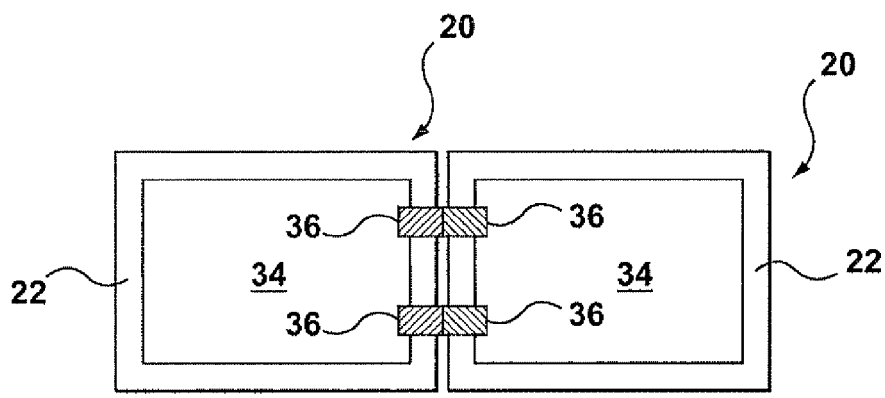
FIG. 8 shows two microtile units two interface pad pairs placed therebetween.

While the present embodiment is illustrated using two adjacently positioned pads, dimensioned for example to be registered relative to one another, in some embodiments, one pad 36 can be used, as shown in FIG. 7. In this configuration, one pad is located between two adjacent microtile units 20 so as to provide the necessary expansion. It is also possible that a plurality of pads may be spaced along any one side of a microtile unit, as shown in FIG. 8 in which two pad pairs are used.

Table 1 provides an exemplary set of thermal expansion characteristics of a rigid chassis compared to a screen.

TABLE 1

Thermal Expansion of Chassis and Screen (no interface pad)

| Component | Nominal Width (mm) | CTE (mm/m-10 C.) | Width increase over 40 C. (mm) | Width at Temp (mm) |
|---|---|---|---|---|
| Chassis | 408 | 0.259 | 0.42 | 408.42 |
| Screen | 408 | 0.67 | 1.09 | 409.09 |
| | | Gap Required | | 0.67 |

While both the chassis and screen are dimensioned with a nominal width of 408 mm, the actual width of each component at operating temperature (e.g. 40° C. higher) differs as the CTE of the chassis is lower than the CTE of the screen. As shown, the screen expands to a total width of 409.09 mm, while the chassis expands to a total width of 408.42, representing a 0.67 mm difference. In this scenario, because the screen expands to a greater extent than the chassis, significant gaps between adjacent screens would be required to avoid potentially damaging compression/collision.

Table 2 exemplifies how an interface pad can be used to increase the overall thermal expansion characteristics of the chassis

TABLE 2

Thermal Expansion of Rigid Frame/Interface pad and Screen

| Component | | Nominal Width (mm) | CTE (mm/m-10 C.) | Width increase over 40 C. (mm) | Width at Temp (mm) |
|---|---|---|---|---|---|
| Chassis | Rigid Frame | 358 | 0.259 | 0.37 | 358.37 |
| | Interface pad | 50 | 3.6 | 0.72 | 50.72 |
| | Screen | 408 | 0.67 | 1.09 | 409.09 |
| | | Gap Required | | | 0 |

As shown in Table 2, for a screen having a nominal width of 408 mm, an exemplary arrangement would be a rigid frame and interface pad having nominal widths of 358 mm and 50 mm, respectively. The combination of the rigid frame and interface pad results in substantially the same thermal expansion characteristic compared to the screen, resulting in a reduced gap requirement. While the rigid frame expands to a limited extent (0.37 mm), additional expansion is provided by way of the interface pad, which has a CTE suited to achieve the additional expansion necessary (0.72 mm). As such, with the expansion of the chassis (total width 409.09 mm) matched to that of the screen (total width 409.09 mm), the sizing of the gap between adjacent screens can be reduced.

Figure 9A:
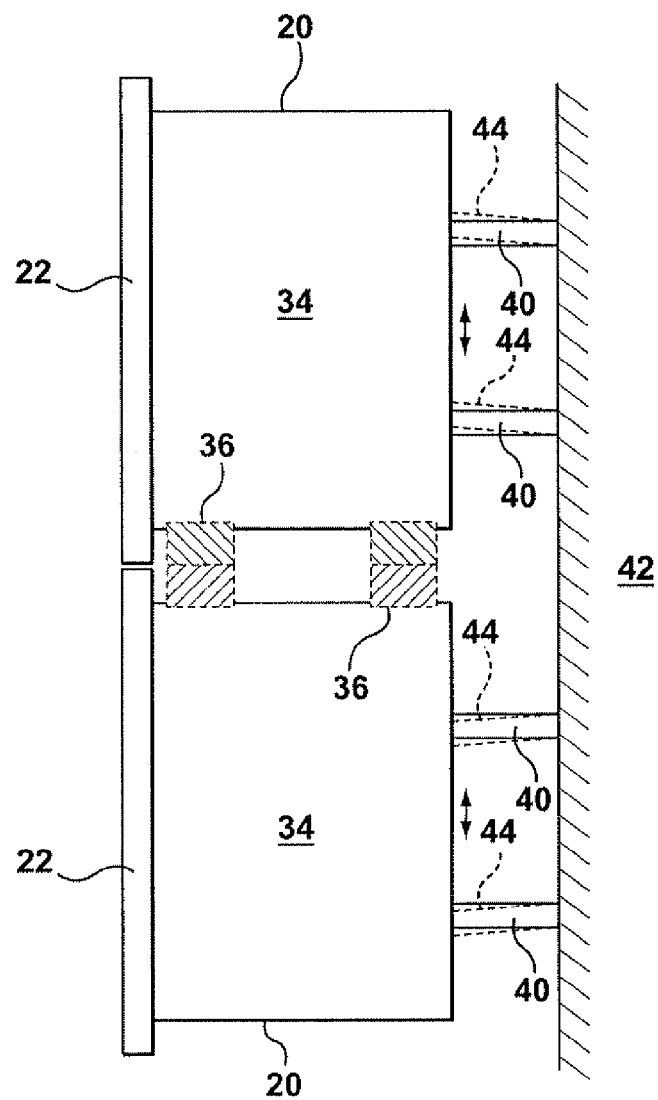
FIG. 9A shows an exemplary fastener used to affix a unit to a supporting structure.
Figure 9B:
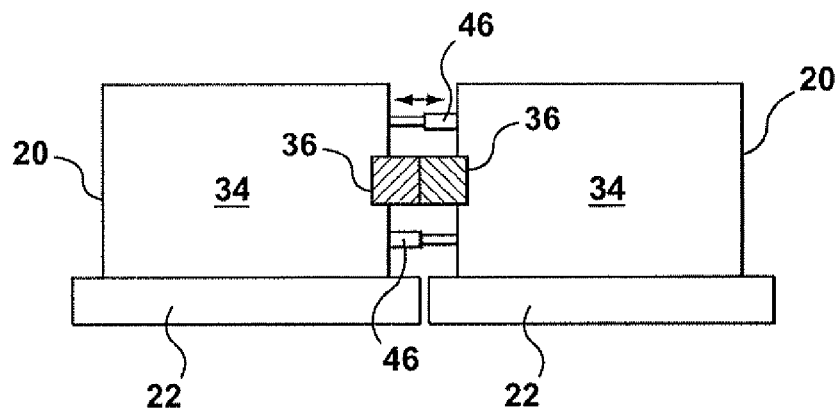
FIG. 9B shows an exemplary extendible fastener used between adjacent units.

With the use of the interface pads, the chassis of each microtile unit in an imaging system is configured to be moveable in accordance with the expansion facilitated by the interface pads. The movement of each chassis may be facilitated a number of ways, for example through the use of specialized fasteners positioned between the microtile unit and a supporting structure (e.g. a wall) and/or between adjacently positioned microtile units. For example, as shown in FIG. 9A, flexible fasteners 40 may be used to attach the microtile unit 20 to a supporting structure 42. As temperatures increase, the interface pads 36 expand, urging adjacent microtiles away from one another, with the fasteners permitting a degree of deflection 44 to accommodate the expansion occurring in the screen 22. As shown in FIG. 9B, between adjacent microtile units 20, suitable fasteners 46 may be configured to allow for a limited extent of extension to accommodate the expansion.

The fasteners may also be configured to bias each chassis within the chassis platform back to a first neutral position, as generally determined at room temperature. With this arrangement, the interface pads would be configured to impart sufficient force to overcome the biasing effect, thereby causing expansion of the overall chassis platform. Upon removal of the expansion force, for example when the imaging system is turned off or ambient temperatures decrease, the fasteners would then bias the chassis platform back to the first neutral position.

Figure 10:
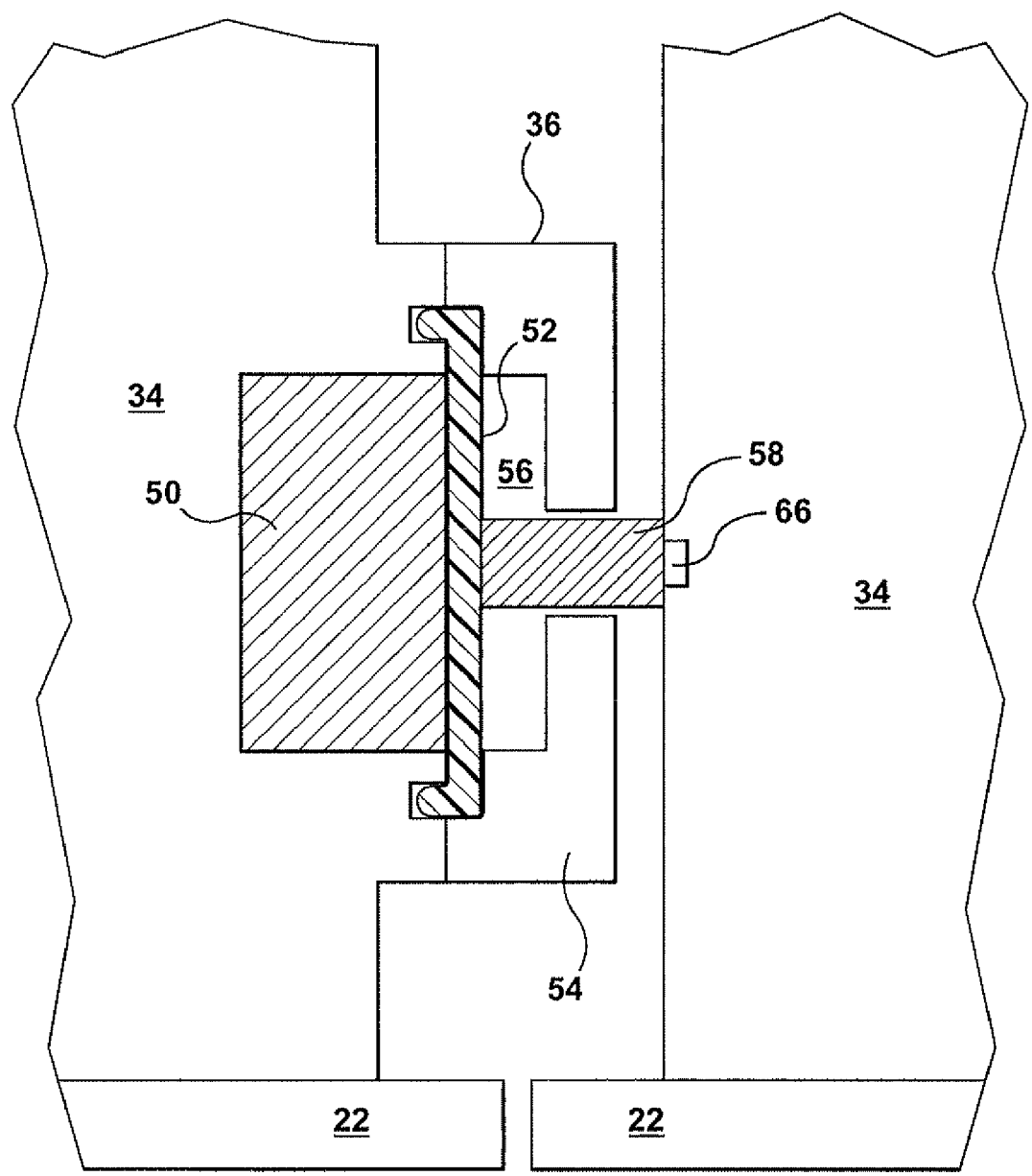
FIG. 10 is an alternate arrangement of an interface pad comprising a fluid/gas filled reservoir.

An alternate embodiment of the interface pad is presented in FIG. 10. In this arrangement, the interface pad 36 generally comprises a fluid or gas-filled reservoir 50, a diaphragm 52 bordering one side of the reservoir 50, a diaphragm retainer 54, an expansion space 56 defined by the diaphragm retainer 54, and a movable piston 58. In use, a temperature rise creates a volumetric expansion of the fluid or gas, which deflects the diaphragm 52. The piston 58 then translates the diaphragm motion to the adjacent tile, resulting in expansion of the chassis to accommodate expansion in the screen. As the temperature drops following usage, the volume of the fluid or gas reduces. The diaphragm then returns to the first neutral position, causing the piston to retract from the interface pad.

Figure 11:
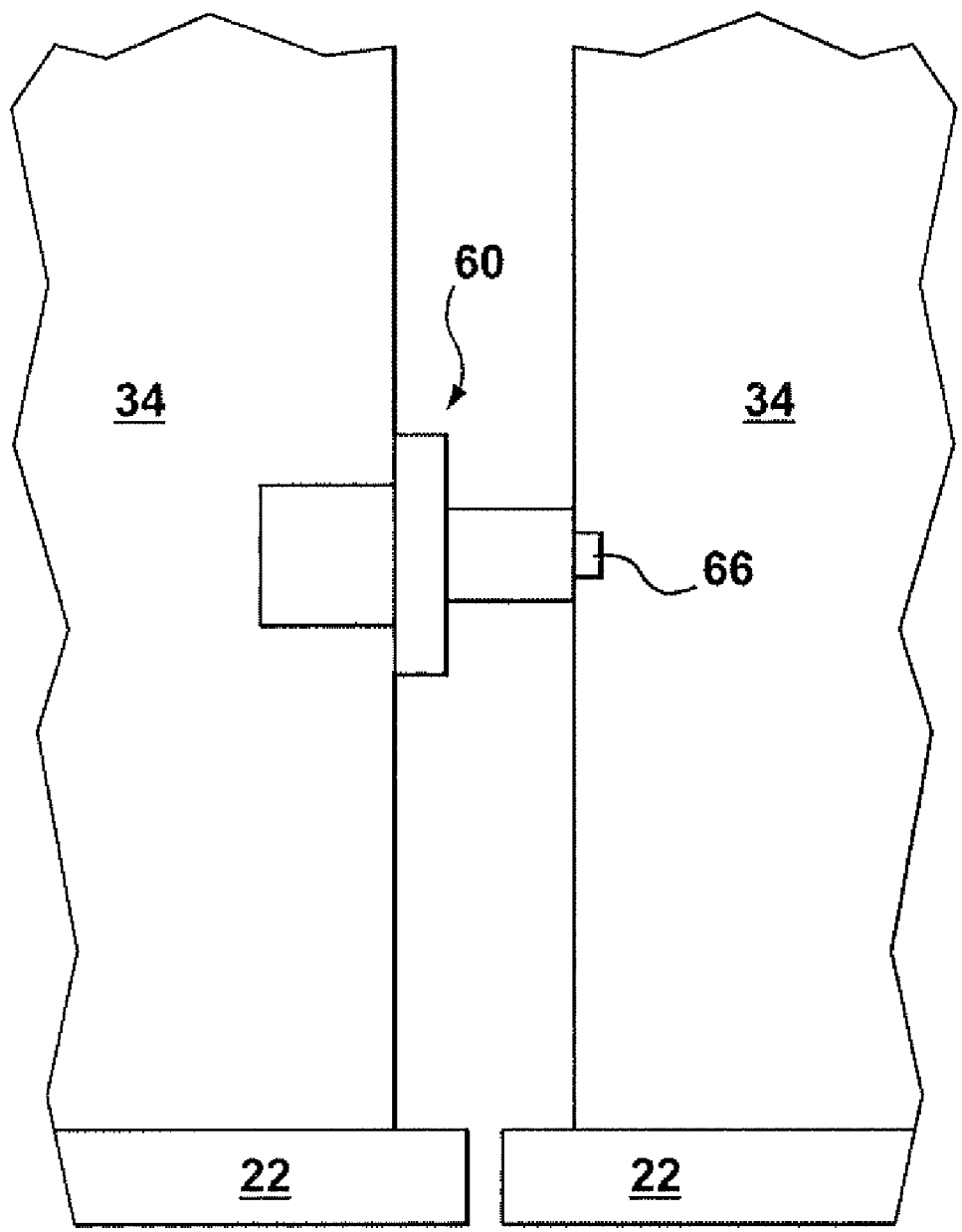
FIG. 11 is an alternate arrangement of an interface pad comprising a thermal actuator.

A further embodiment is shown in FIG. 11 in which the interface pad 36 comprises a thermal actuator 60 mounted on the rigid frame 34 that provides a fixed translation at a given temperature. These could be used with an activation temperature that occurs at a predetermined temperature point (e.g. ¾ of the temperature range) that precedes screen compression or collision.

In this embodiment, the thermal actuator provides a step deflection at a prescribed temperature. When the actuator is activated, it pushes the adjacent tile further away, thus increasing the gap between the microtiles, preventing screen compression/collision. When the temperature drops below the activation temperature, the actuator will retract and gap will diminish to its original size.

Table 3 exemplifies for an interface pad with thermal actuator can be used to increase the overall thermal expansion characteristics of the chassis.

TABLE 3

Control of gap spacing using an interface pad with thermal actuator.

| Temperature (C.) | Gap (no thermal actuator) | Gap (with thermal actuator) |
|---|---|---|
| 20 | 0.5 | 0.5 |
| 30 | 0.25 | 0.25 |
| 40 | 0 | 0 + 0.5 = 0.5 |
| 50 | −0.25 (collision) | −0.25 + 0.5 = 0.25 |

In this example, the nominal gap between tiles is set to 0.5 mm at 20° C. When the temperature rises from 20° C. to 40° C., the screen will have grown approximately 0.5 mm, which means there is no longer a gap. At this point, further temperature rise will result in screen compression/collision. With an interface pad comprising a thermal actuator configured for a 0.5 mm deflection at an activation temperature of 40° C., collision is averted as the gap continues to be maintained.

It should be noted that it is not necessary that the thermal expansions be matched exactly. In instances where the expansion material provides only a portion of the screen growth, it will still allow a smaller nominal gap than if the chassis of adjacent microtiles were rigidly attached. The reduction in the nominal gap has the effect of improving overall image quality by reducing the optical transition from one microtile to the next Regardless of whether the interface pad is configured as a solid pad, a fluid/gas filled pad, or one comprising a thermal actuator, the end effect is the ability to substantially match the overall expansion of the chassis to match that of the screen as it increases in temperature. As each chassis in the overall chassis platform expands, the gap between screens is maintained, allowing for the noted expansion in the screens to occur without the danger of compression or collision between adjacent screens. It should be noted that depending on the configuration of the screen (e.g. square vs rectangular), interface pads of differing expansion characteristics may be necessary. For example, in instances where the screen is square, the top/bottom and side pad expansion characteristics would be approximately the same, as the amount of screen expansion would be the same in both directions. For rectangular screens positioned in a landscape configuration, expansion would be greater across the width as compared to the height. As such, interface pads comprising greater expansion characteristics would be used along the sides of the microtile units, as compared to the interface pads used on the top/bottom interfaces.

Figure 12:
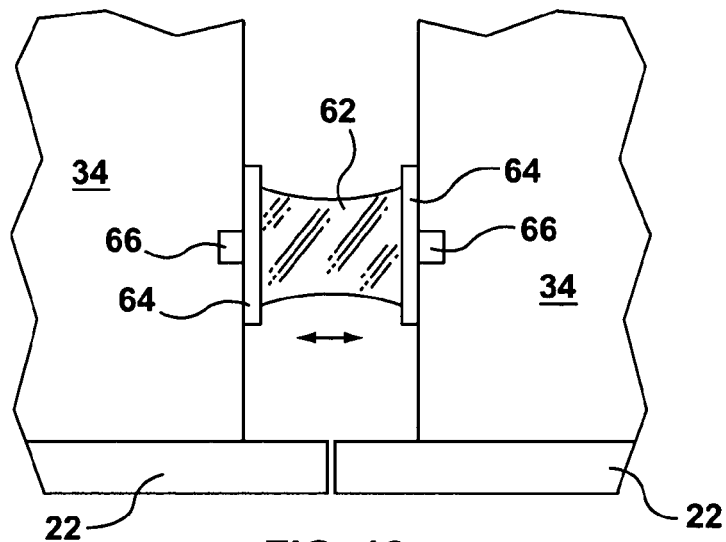
FIG. 12 shows an exemplary bi-directional interface pad capable of both push/pull functionality.
Figure 13A:
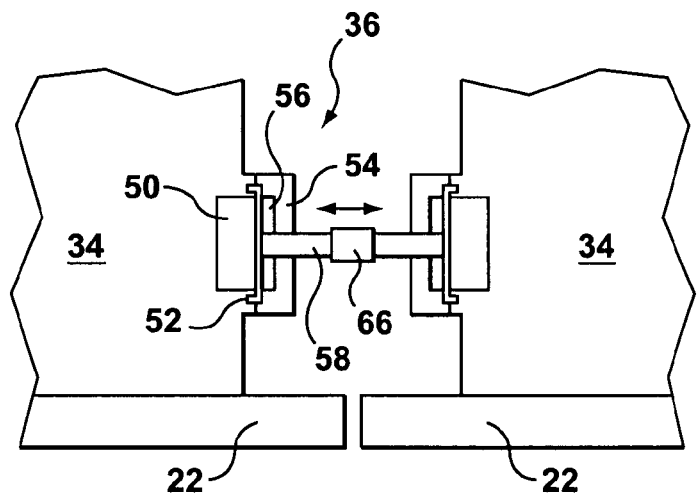
FIG. 13A shows two fluid/gas filled interface pads arranged in side-by-side configuration with a coupler used to effect both push/pull functionality.
Figure 13B:
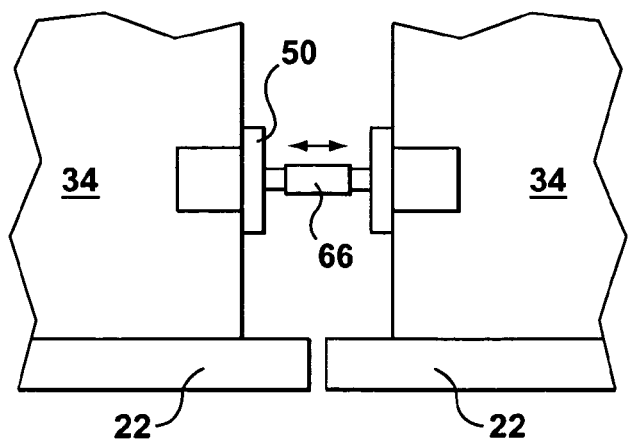
FIG. 13B shows two thermal actuator interface pads arranged in side-by-side configuration with a coupler used to effect both push/pull functionality.

While the aforementioned fasteners may be used to urge the chassis platform back into the first neutral position, the interface pads themselves may be used. For example, the interface pads may be fixed at each end such that the respective contact surfaces can be both pushed during expansion, and pulled during contraction. An exemplary configuration of a bi-directional interface pad is shown in FIG. 12. In this arrangement, the interface pad comprises a thermally expansive material 62 molded or bonded to complementary end blocks 64. Each end block would further comprise at least one suitable fastener 66, including but not limited to a threaded stud or a fastening plate with holes, etc. As shown, the fastener used is a threaded stud that would be received through a corresponding hold in the side of the rigid frame 34. In use, the thermally expansive material 62 would expand upon increases in temperature, and contract upon cooling. With the material 62 being bonded to respective end blocks 64, the end effect is both the pushing and pulling of adjacent units 20 in response to temperature changes. Similar principles are applicable to the fluid/gas filled and thermal actuator interface pads wherein the moveable pistons of each configuration are suitably fastened to the adjacent tile using a suitable fastener 66, including but not limited to a threaded stud or a fastening plate with holes, etc. Referring back to FIGS. 10 and 11, each respective piston is shown to be fastened to the adjacent tile using a threaded stud 66. In some embodiments, adjacently positioned pads can be connected in series to effect both a push and pull effect upon changes in temperature, as shown in FIGS. 13A and 13B. As shown, a coupler 68 is provided to allow for both push and pull during respective expansion and contraction of the interface pad 36.

In the embodiments described above, external sources of energy are not necessary. The noted expansion in the interface pads arise from the physical response of the materials to temperature. This has the potential to reduce the overall cost of operation compared to powered systems. Nevertheless, interface pads comprising powered actuators such as MEMS thermal actuators and piezoelectric actuators are further alternatives that can be used in the interface pad.

While generally described within the framework of 'block' microtiles, the expanding chassis can be suitably applied to other imaging units. For example, the expanding chassis described here can be used with larger-format imaging cubes used, for example in control rooms.

It will be appreciated that, although embodiments have been described and illustrated in detail, various modifications and changes may be made. While several embodiments are described above, some of the features described above can be modified, replaced or even omitted. All such alternatives and modifications are believed to be within the scope of the invention and are covered by the claims appended hereto.

The invention claimed is:

1. An expanding chassis for an imaging unit for use in imaging systems having a plurality of imaging units arranged in an array, the expanding chassis comprising:
    a rigid frame for housing a light engine and related circuitry, and for mounting a screen on a front surface of said rigid frame for use with said light engine; and
    at least one expandable interface pad on at least one side of said rigid frame;
    said rigid frame and said expandable interface pad having a combined thermal expansion characteristic that provides an overall expansion in the expanding chassis that substantially matches the expansion of said screen,
    wherein the interface pad is comprised of a fluid or gas filled reservoir, a deflectable diaphragm in fluid communication with said reservoir, and a piston in contact with said diaphragm, wherein said piston is movable in response to deflection of said diaphragm resulting from volumetric temperature-dependent expansion/retraction of said fluid or gas.

2. An expanding chassis for an imaging unit for use in imaging systems having a plurality of imaging units arranged in an array, the expanding chassis comprising:
    a rigid frame for housing a light engine and related circuitry, and for mounting a screen on a front surface of said rigid frame for use with said light engine; and
    at least one expandable interface pad on at least one side of said rigid frame;
    said rigid frame and said expandable interface pad having a combined thermal expansion characteristic that provides an overall expansion in the expanding chassis that substantially matches the expansion of said screen,
    wherein the interface pad is comprised of a thermal actuator that provides a fixed translation at a given temperature.

3. In a microtile unit comprising a chassis and a screen, an improvement comprising an expanding chassis for matching the expansion noted in the screen, the expanding chassis comprising
    a rigid frame for housing a light engine and related circuitry, and for mounting a screen on a front surface of said rigid frame for use with said light engine; and
    at least one expandable interface pad on at least one side of said rigid frame;
    said rigid frame having a first thermal expansion characteristic, said interface pad having a second thermal expansion characteristic, the combined thermal expansion characteristics providing an overall expansion in the expanding chassis that substantially matches the expansion of said screen,
    wherein the interface pad is comprised of a fluid or gas filled reservoir, a deflectable diaphragm in fluid communication with said reservoir, and a piston in contact with said diaphragm, wherein said piston is movable in response to deflection of said diaphragm resulting from volumetric temperature-dependent expansion/retraction of said fluid or gas.

4. In a microtile unit comprising a chassis and a screen, an improvement comprising an expanding chassis for matching the expansion noted in the screen, the expanding chassis comprising
    a rigid frame for housing a light engine and related circuitry, and for mounting a screen on a front surface of said rigid frame for use with said light engine; and
    at least one expandable interface pad on at least one side of said rigid frame;
    said rigid frame having a first thermal expansion characteristic, said interface pad having a second thermal expansion characteristic, the combined thermal expansion characteristics providing an overall expansion in the expanding chassis that substantially matches the expansion of said screen,
    wherein the interface pad is comprised of a thermal actuator that provides a fixed translation at a given temperature.

* * * * *